US006966835B2

(12) United States Patent
Graham

(10) Patent No.: US 6,966,835 B2
(45) Date of Patent: Nov. 22, 2005

(54) GAMING MACHINE WITH REFRACT SYMBOL

(75) Inventor: Philippa Graham, Lane Cove (AU)

(73) Assignee: Aristocrat Technologies Australia Pty Ltd (AU)

( * ) Notice: Subject to any disclaimer, the term of this patent is extended or adjusted under 35 U.S.C. 154(b) by 323 days.

(21) Appl. No.: 10/182,387

(22) PCT Filed: Mar. 7, 2001

(86) PCT No.: PCT/AU01/00233

§ 371 (c)(1), (2), (4) Date: Jul. 29, 2002

(87) PCT Pub. No.: WO01/71678

PCT Pub. Date: Sep. 27, 2001

(65) Prior Publication Data

US 2003/0013518 A1 Jan. 16, 2003

(30) Foreign Application Priority Data

Mar. 22, 2000 (AU) ............................................ PQ 6409

(51) Int. Cl.[7] ................................................ A63F 13/00

(52) U.S. Cl. ............................. 463/25; 463/20; 463/16; 463/1

(58) Field of Search ........................... 273/138.1, 138.2, 273/139, 143 R, 269; 463/1, 16, 17, 18, 19, 20, 21, 25, 46; 700/90, 91, 92, 93; 283/903

(56) References Cited

U.S. PATENT DOCUMENTS

| | | | | |
|---|---|---|---|---|
| 5,630,586 A | | 5/1997 | Lowden | 273/138.2 |
| 5,882,259 A | * | 3/1999 | Holmes et al. | 463/13 |
| 6,033,307 A | * | 3/2000 | Vancura | 463/20 |
| 6,190,254 B1 | * | 2/2001 | Bennett | 463/13 |
| 6,200,217 B1 | | 3/2001 | Osawa | 463/20 |

FOREIGN PATENT DOCUMENTS

| | | |
|---|---|---|
| EP | 1 063 622 A2 | 12/2000 |
| WO | WO 97/32286 | 9/1997 |

* cited by examiner

*Primary Examiner*—Jessica Harrison
*Assistant Examiner*—Jason Skaarup
(74) *Attorney, Agent, or Firm*—Charles Berman; Greenberg Traurig LLP

(57) ABSTRACT

A gaming machine has a display and a game controller arranged to control images displayed on the display. The game controller is arranged to play a game wherein at least one random event is caused to be displayed on the display and, if a predefined winning event occurs, the machine awards a prize. The game controller causes a special symbol to be displayed on the display, the special symbol, when a payline passes through that special symbol, causing the payline to split into a main payline and at least one branch payline.

14 Claims, 7 Drawing Sheets

GAMING MACHINE WITH REFRACT SYMBOL

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein at least one random event is caused to be displayed on the display means and, if a predefined winning event occurs, the machine awards a prize, the gaming machine being characterised in that the game control means causes a special symbol to be displayed on the display means, the special symbol, when a payline passes through that special symbol, causing the payline to split into a main payline and at least one branch payline.

The game may be a spinning reel game having at least one payline passing through various combinations of symbols on the reels and from which a determination is made as to whether or not one or more prize winning events occur.

While the invention may be applicable to a multi-line game, the preferred embodiment is for a single line game. The single line is normally a centre payline. Pays may be determined for left to right and for right to left combinations.

When the special symbol, which, for ease of explanation, will be referred to as a refract symbol, appears on the payline, it causes the payline to branch a predetermined number of times. Those skilled in the art will appreciate that a spinning reel machine normally has three rows of symbols with, for a single payline machine, the payline passing through the centre row. Assuming the refract symbol appears on the centre row, it may cause the payline to be "refracted" into the upper and lower rows as well as continuing along the centre row.

The payline may branch into at least one adjacent visible row after the occurrence of the special symbol. It will also be appreciated that the refract symbol may appear on another row of the machine. Then if a payline, whether a main payline or a refracted payline passes through such other refract symbol, that payline may also be refracted further but only in respect of visible symbols after that other refract symbol.

The refract symbol preferably has a secondary function. The secondary function of the refract symbol may be a substitute function where the refract symbol substitutes for all other symbols except scatter symbols.

BRIEF DESCRIPTION OF THE DRAWINGS

The invention is now described by way of example with reference to the accompanying drawings in which.

DETAILED DESCRIPTION OF THE DRAWINGS

Figure 1:
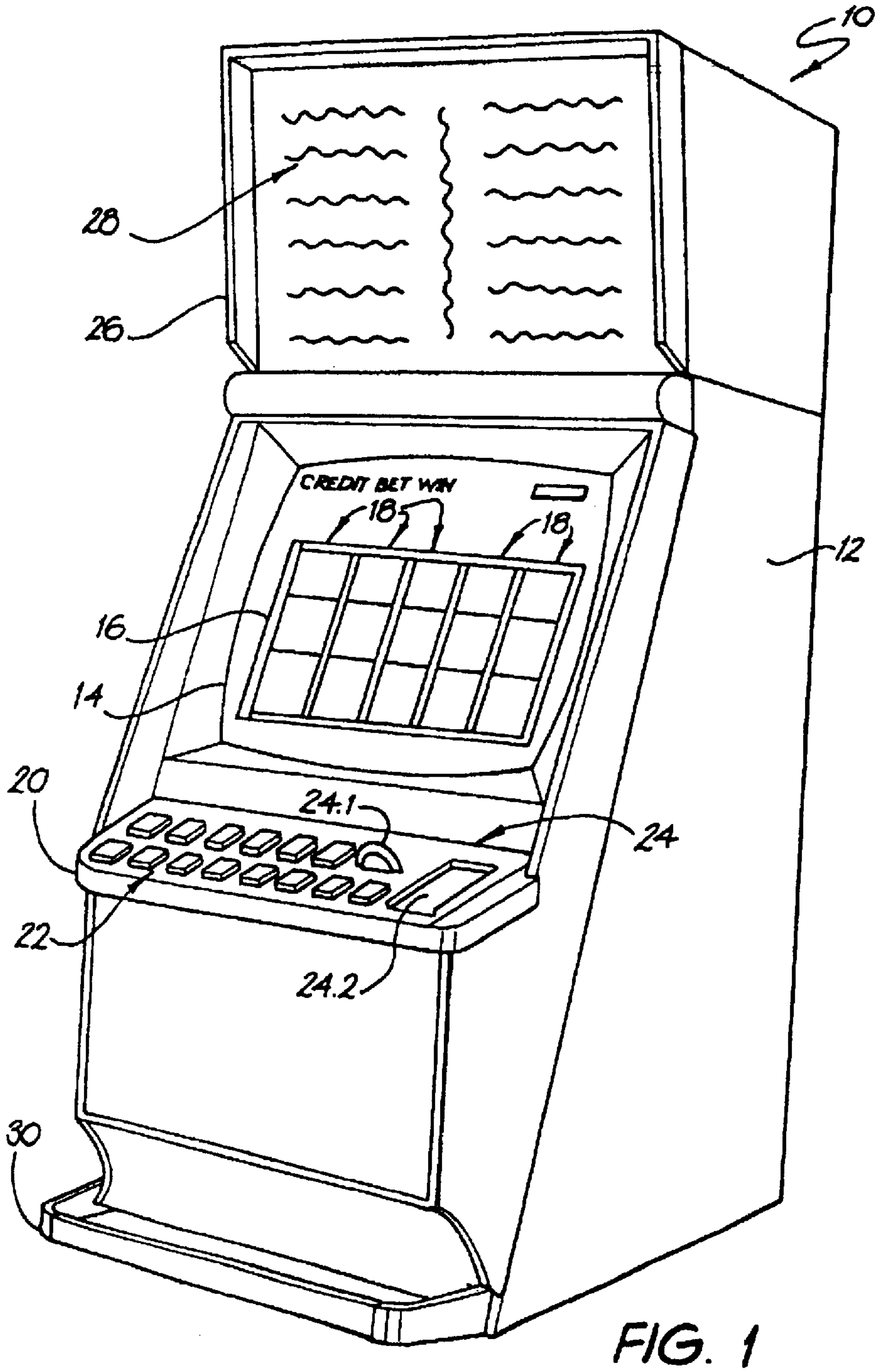
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
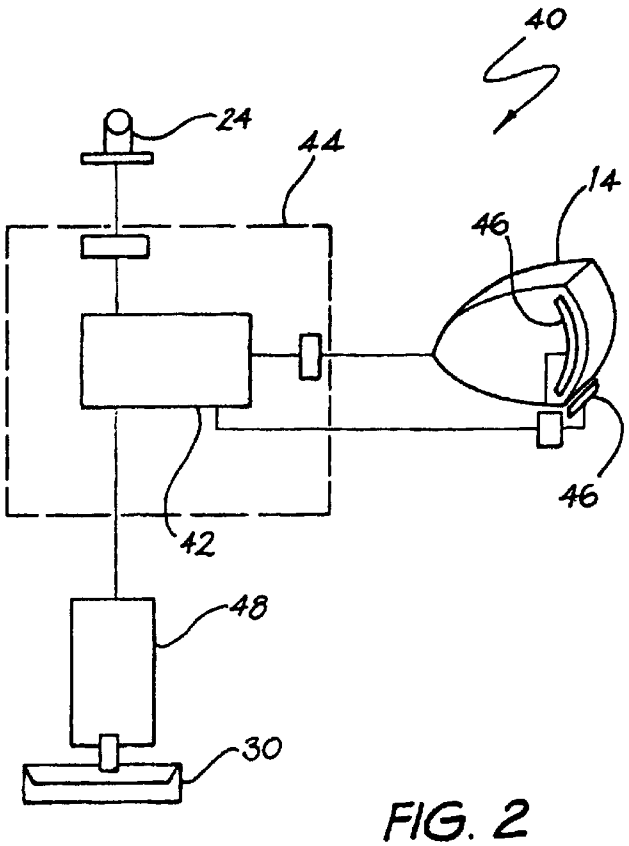
FIG. 2 shows a schematic block diagram of a control circuit of the gaming machine of FIG. 1.

Referring now to FIG. 2 of the drawings, a control means or control circuit 40 is illustrated. A program which implements the game and user interface is run on a processor 42 of the control circuit 40. The processor 42 forms part of a controller 44 which drives the screen of the video display unit 14 and which receives input signals from sensors 46. The sensors 46 include sensors associated with the bank 22 of buttons and touch sensors mounted in the screen. The controller 44 also receives input pulses from the mechanism 24 indicating that a player has provided sufficient credit to commence playing. The mechanism 24 may, instead of the coin input chute 24.1 or the bill collector 24.2, or in addition thereto be a credit card reader (not shown) or any other type of validation device.

Finally, the controller 44 drives a payout mechanism 48 which, for example, may be a coin hopper for feeding coins to the coin tray 30 to make a pay out to a player when the player wishes to redeem his or her credit.

A game played on the gaming machine 10 includes a special symbol as will be discussed in greater detail below. The special symbol, when a payline passes through it, causes the payline to branch or refract. Accordingly, in use, the special symbol has the appearance of a device which causes a beam of light to refract. In particular, the special symbol has the appearance of a diamond or prism. In the examples which follow, the special symbol, or refract symbol, is illustrated as an 'R' in FIGS. 3*a* to 3*c* of the drawings.

Figure 3A:
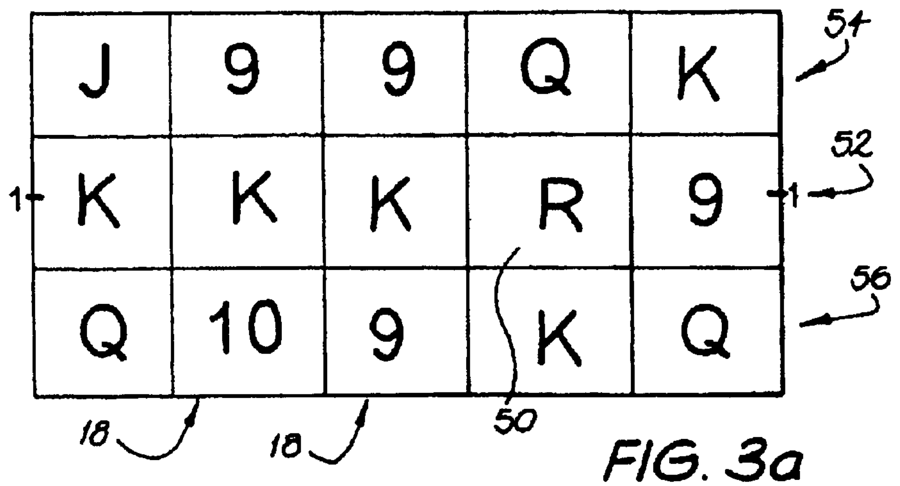
FIGS. 3*a* to 3*c* show various examples of screen layouts of game results of games played on the gaming machine of FIG. 1.
Figure 3B:
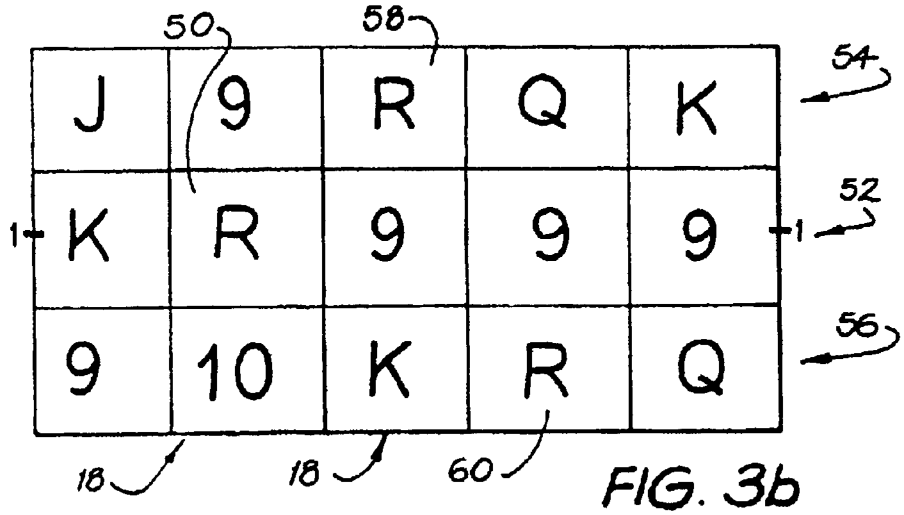
Figure 3C:
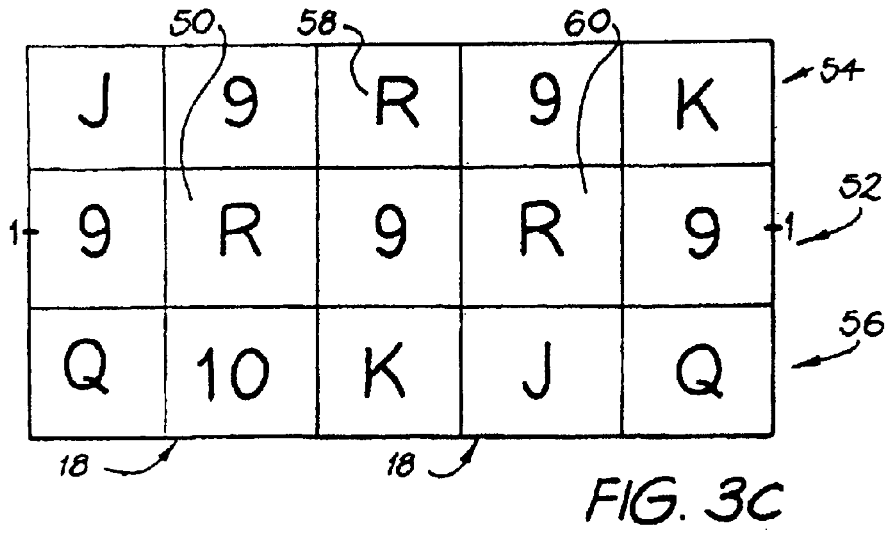
Figure 4:
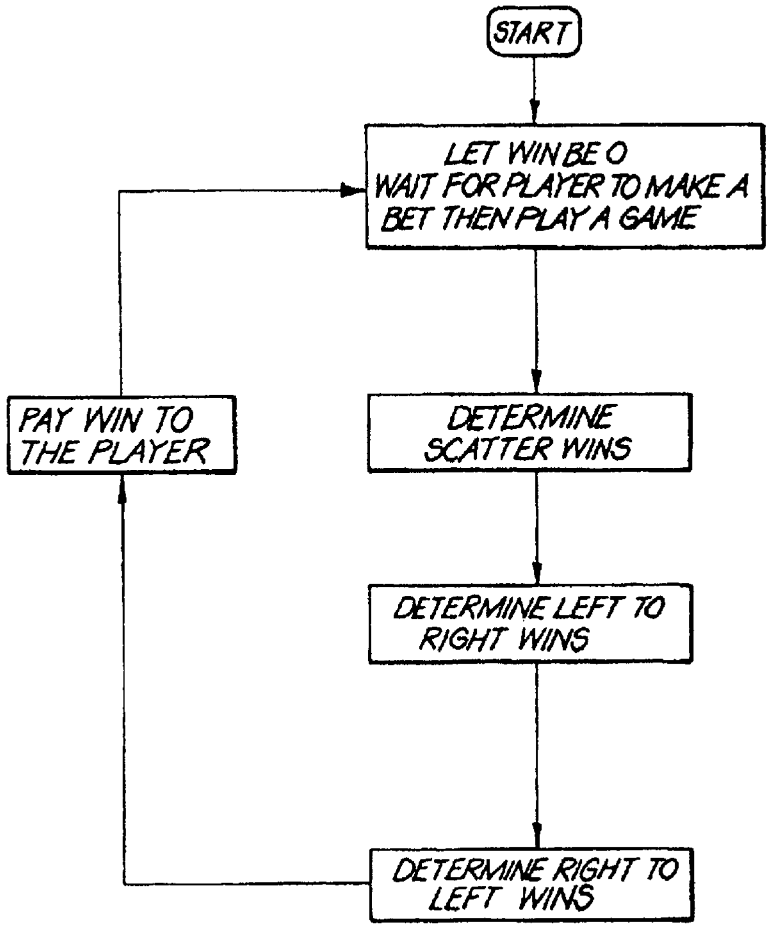
FIG. 4 shows a flow chart of a primary game in respect of the game played on the gaming machine.
Figure 5:
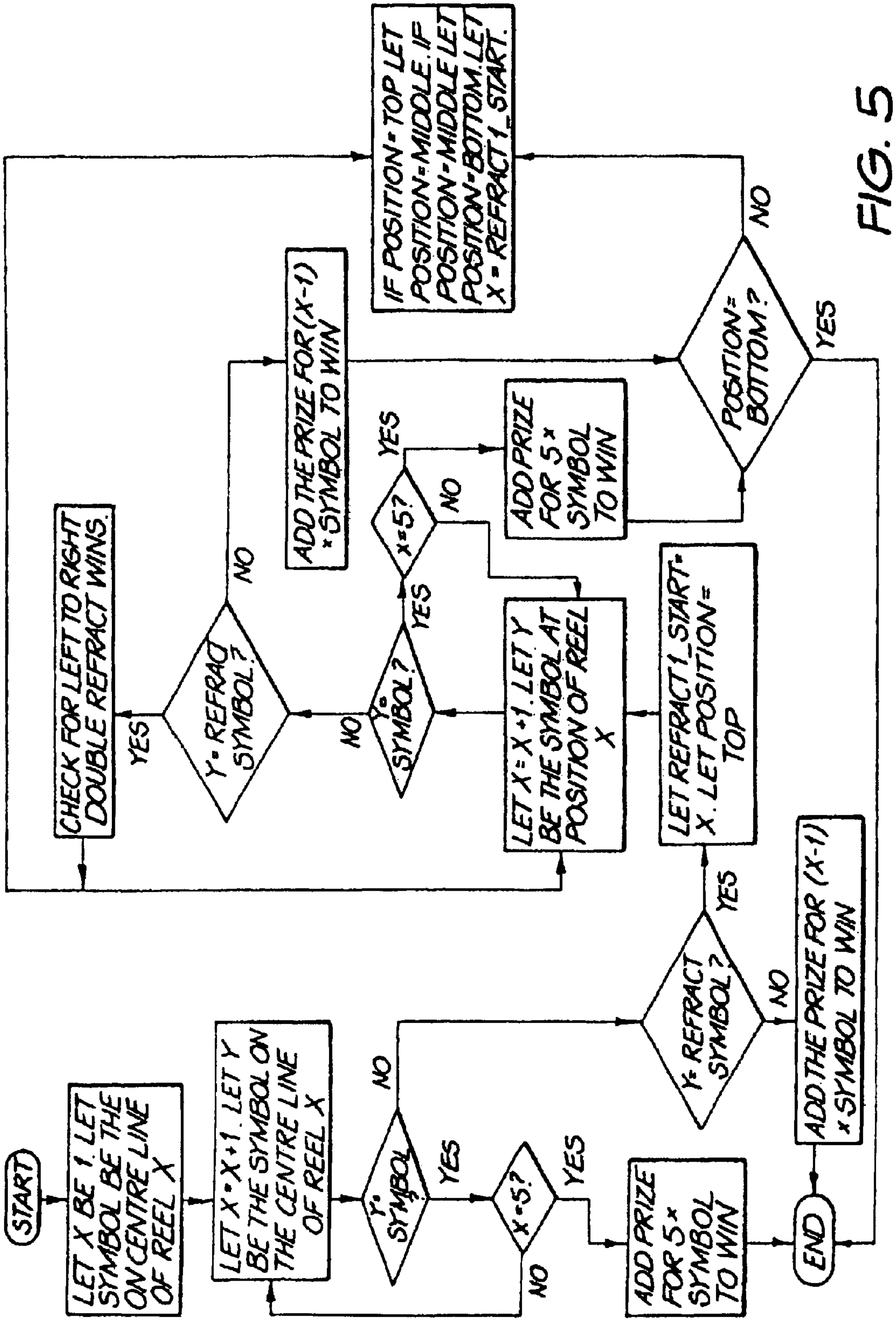
FIG. 5 shows a flow chart indicating the procedure of the "Determine left to right wins" step in the flow chart of FIG. 4.
Figure 6:
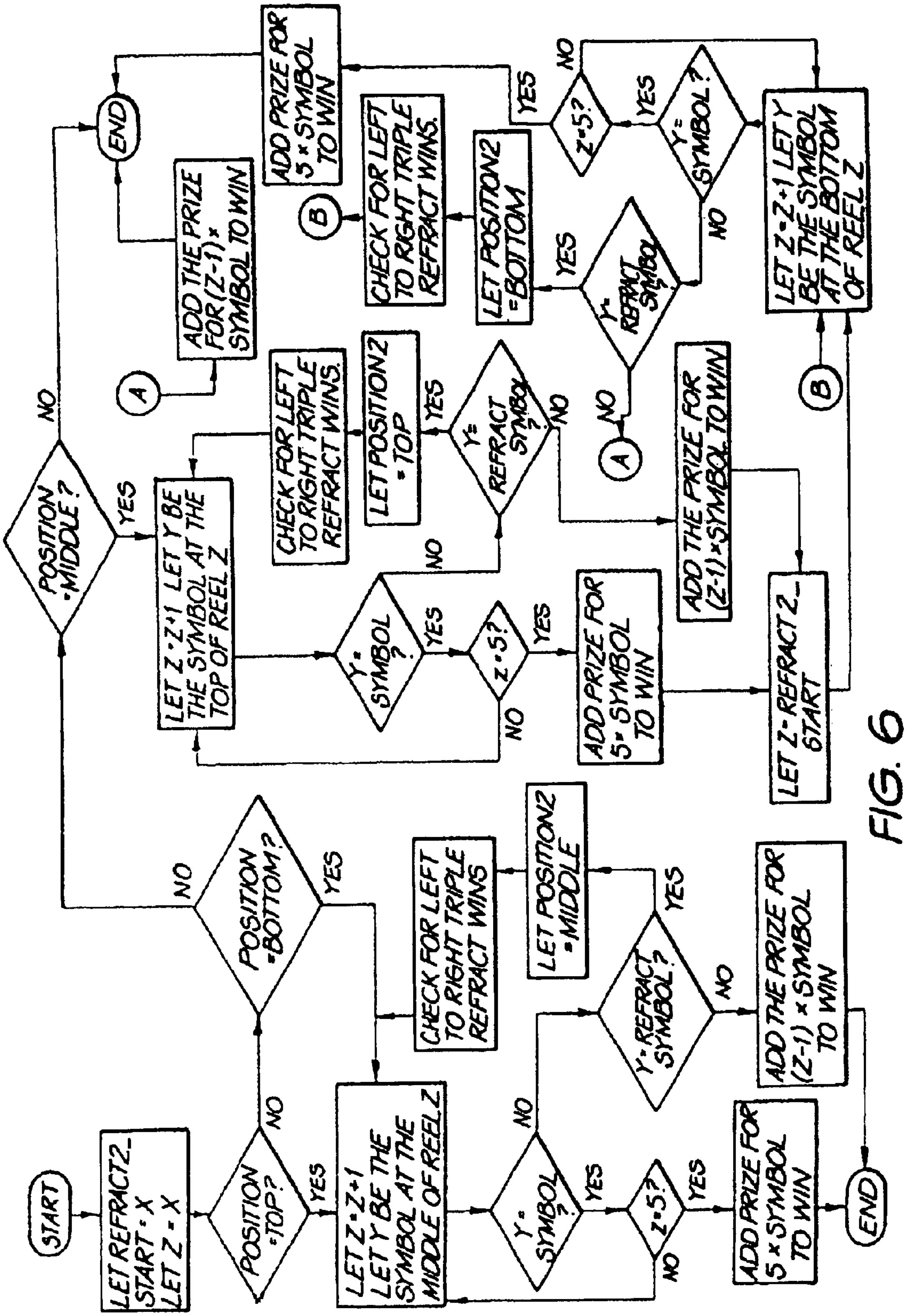
FIG. 6 shows a flow chart indicating the procedure of the "Check for left to right double refract wins" step in the flow chart of FIG. 5.
Figure 7:
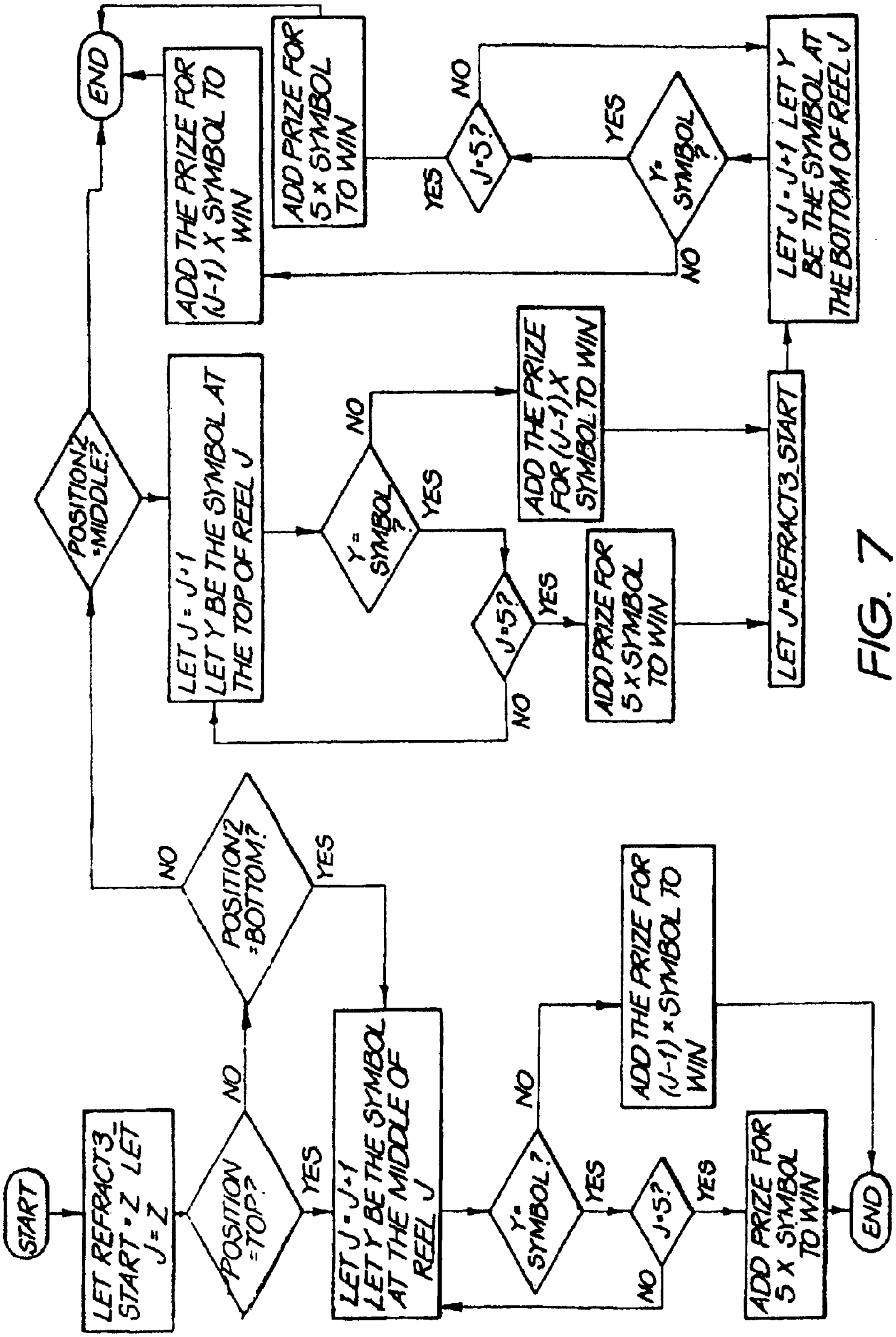
FIG. 7 shows a flow chart indicating the procedure of the "Check for left to right triple refract wins" step in the flow chart of FIG. 6.

Referring now to FIGS. 3*a* to 3*c* of the drawings screen displays of various examples of the game 16 are shown.

In the embodiment shown in FIG. 3*a* of the drawings, a single R symbol 50 has been spun up in the centre row 52 on the fourth reel 18.

The payout of the game 16 is awarded for left-to-right combinations and also for right-to-left combinations. In addition, the R symbol 50 acts as a substitute symbol for all symbols except scatter symbols. The game is designed so that the R symbol 50, or a plurality of such R symbols 50, appears only on reels two, three and four of a five reel gaming machine.

The R symbol 50 substitutes for a K symbol in the row 52. The effect of the R symbol 50 is to cause the payline passing through it to refract or branch into the adjacent rows above and below the row in which the R symbol 50 appears. The R symbol 50 causes the payline to branch only into a row which is visible on the screen 16. Thus, with the R symbol 50 appearing in the row 52 it refracts into the second row 54 and the third row 56.

Considering a left-to-right pay, a prize is awarded for the payline passing through the 3×K symbols in the row 52 in respect of the first three reels 18. The R symbol 50 substitutes for the King symbol on the fourth reel 18. The R symbol 50 further causes the payline to branch or refract into the second row 54 and the third row 56 after the R symbol 50 In other words, for the left-to-right pay, the payline branches into the second and third rows in the fifth reel 18. Thus, a prize is paid for 4×K in the row 52 and also for 5×K taking into account the refracted payline extending into the symbol in row 54 on the fifth reel 18. As there is a further, refracted payline passing through the symbols on the centre row of the first four reels 18 and the symbol in row 56 on the fifth reel 18, a further prize is paid for this payline as it contains 4×K.

It is to be noted that the R symbol 50 only causes the payline to branch in respect of reels after the reel 18 having the R symbol 50. In other words, in the example shown in FIG. 3*a* of the drawings, the payline does not branch into the same reel, i.e., the fourth reel but only into the fifth reel.

As the machine also pays for right-to-left combinations, a prize is paid for 2×9 in the centre row 52. 4×9 taking into account the R symbol 50 in the row 52 and the two 9s, after the R symbol 50 (in the right-to-left direction), in the second row 54. Similarly, a prize is paid for 3×9 being the 9 in the centre row on the fifth reel, the R symbol 50 in the row 52 and the 9 in the third row 56 on the third reel.

In the embodiment shown in FIG. 3*b* of the drawings, multiple R symbols 50, 58 and 60 are shown. In this embodiment of the invention, a similar payout arrangement applies as in respect of FIG. 3*a* of the drawings. In respect of the R symbol 58 in row 54, the payline passing through the R symbol 58 only branches into row 52 and continues in row 54. In other words, the refract symbol only branches into adjacent rows or symbols which are visible on the screen. Similarly, the payline passing through the R symbol 60 only branches into row 52 and continues in row 56.

In this embodiment, for a left-to-right pay, the player is paid for 2×K in row 52. 3×K twice, firstly for the combination of K, R symbol 50 in row 52, R symbol 58 and Q and K in row 54 and, secondly, for the combination of K, R symbol 50 in row 52. R symbol 58 in row 54 and the two 9s in row 52, and 4×K twice, firstly for the combination of K, R symbol 50 in row 52, K, R symbol 60 and Q in row 56 and, secondly, for the combination of K, R symbol 50 in row 52, K, R symbol 60 in row 56 and 9 in row 52.

It is to be noted also that the R symbol 50, 58 or 60 only refracts into an adjacent row and does not refract into a subsequent row. Thus, for example, in respect of the R symbol 60 in row 56, the R symbol 60 will cause the payline to branch into row 52, when considering a left-to-right pay, in the fifth reel 18 but not into the row 54 on the fifth reel 18.

For the right-to-left pay, the player will be paid for 4×9 twice, firstly, for the 9, R, 9, R combination on the payline passing only through row 52 and, secondly, for the 9, R, 9, R combination for the payline passing through row 52 and being refracted into row 54. The player will also be paid 5×9 for the payline refracted through the R symbol 50 on the second reel 18 into the symbol in row 56 on the first reel 18.

In the example shown in FIG. 3*c* of the drawings, the R symbol 60 on the fourth reel is shown in the row 52.

As a result of this combination, the player will be paid for 5×9 in row 52. The player will also be paid, in a left-to-right pay, for 4×9 and 2×9 refracted through the R symbol 50 on the second reel 18, 4×9, twice, for the payline refracted through the R symbol 60 on the fourth reel 18. 5×9 for the payline refracted through the R symbols 50 and 58 and 4×9, twice, for the payline refracted through all three R symbols 50, 58 and 60.

In respect of a right-to-left pay, because the five of a kind win has already paid out once, it is not paid out again. Accordingly, the player is paid for 4×9 and 2×9 for the payline refracted through the R symbol 60 on the fourth reel 18, 4×9, twice, for the payline refracted through the R symbol 50 on the second reel 18 and 4×9, twice, for the payline refracted through all the R symbols 60, 58 and 50.

Hence, it is an advantage of the invention that, when the refract symbol R appears, a player effectively obtains multiple paylines for the price of a single wager.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming machine having a display means and a game control means arranged to control images displayed on the display means, the game control means being arranged to play a game wherein at least one random event is caused to be displayed on the display means and, if a predefined winning event occurs, the gaming machine awards a prize, wherein a symbol of the game to be displayed on the display means under control of the game control means is a special symbol and, when the special symbol is caused by the game control means to be displayed on the display means, a payline passing through that special symbol splits at a display position of the special symbol on the display means, into a main payline and at least one branch payline on the display means on which the special symbol is displayed.

2. The gaming machine of claim 1 in which the game is a spinning reel game having at least one payline passing through various combinations of symbols on the reels and from which a determination is made as to whether or not one or more winning outcomes occur.

3. The gaming machine of claim 2 in which outcomes are determined for left to-right combinations and for right-to-left combinations of symbols occurring on the payline.

4. The gaming machine of claim 3 in which, when the special symbol appears on the payline, the special symbol causes the payline to branch a predetermined number of times.

5. The gaming machine of claim 3 in which the special symbol has a secondary function.

6. The gaming machine of claim 2 in which, when the special symbol appears on the payline, the special symbol causes the payline to branch a predetermined number of times.

7. The gaming machine of claim 6 in which the special symbol has a secondary function.

8. The gaming machine of claim 6 in which the payline branches into at least one adjacent visible row on the display means after the occurrence of the special symbol.

9. The gaming machine of claim 8 in which the special symbol has a secondary function.

10. The gaming machine of claim 2 in which the special symbol has a secondary function.

11. The gaming machine of claim 1 in which the special symbol has a secondary function.

12. The gaming machine of claim 11 in which the secondary function of the special symbol is a substitute function where the special symbol substitutes for all other symbols except scatter symbols.

13. A gaming machine having a display and a game controller arranged to control images displayed on the display, the game controller being arranged to play a game wherein at least one random event is caused to be displayed on the display and, if a predefined winning event occurs, the gaming machine awards a prize, wherein a symbol of the game to be displayed on the display under control of the game controller is a special symbol and, when the special symbol is caused by the game controller to be displayed on the display, a payline passing through that special symbol splits, at a display position of the special symbol on the display, into a main payline and at least one branch payline on the display on which the special symbol is displayed.

14. A gaming machine having a display and a game controller arranged to control images displayed on the display, the game controller being arranged to play a game wherein at least one random event is caused to be displayed on the display and, if a predefined winning event occurs, the gaming machine awards a prize, wherein a symbol of the game to be displayed on the display under control of the game controller is a special symbol and, when the special symbol is caused by the game controller to be displayed on the display, a payline passing through that special symbol splits, at a display position of the special symbol on the display, into a main payline and at least one branch payline on the display on which the special symbol is displayed so that there are at least two effective paylines on the display on which winning outcomes of the game can occur and at least a part of each of the paylines being coincident with each other.

* * * * *